(12) United States Patent
Pan

(10) Patent No.: US 7,160,007 B2
(45) Date of Patent: Jan. 9, 2007

(54) LICENSE PLATE LIGHT

(75) Inventor: Ko-Chuh Pan, Tainan (TW)

(73) Assignee: Lucidity Enterprise Co., Ltd., Tainan (TW)

( * ) Notice: Subject to any disclaimer, the term of this patent is extended or adjusted under 35 U.S.C. 154(b) by 28 days.

(21) Appl. No.: 11/127,585

(22) Filed: May 11, 2005

(65) Prior Publication Data

US 2006/0256570 A1 Nov. 16, 2006

(51) Int. Cl.
*B60Q 1/56* (2006.01)
(52) U.S. Cl. .................. 362/497; 362/240; 362/374; 362/375; 362/545; 362/800; 40/200; 40/204
(58) Field of Classification Search .............. 362/497, 362/240, 374, 375, 545, 800; 40/200, 204
See application file for complete search history.

(56) References Cited

U.S. PATENT DOCUMENTS 4,868,723 A * 9/1989 Kobayashi .................. 362/497

2002/0196638 A1 * 12/2002 Stephens et al. ............ 362/497
2005/0286258 A1 * 12/2005 Katase ....................... 362/497

* cited by examiner

*Primary Examiner*—Stephen F Husar
*Assistant Examiner*—Meghan K. Dunwiddie

(57) ABSTRACT

A license plate light includes a bottom base, an intermediate member, a support frame, a light base and a light cover. The bottom base is fixed with an automobile body or the license plate, and the intermediate body is fixed on the bottom base. The support frame is fixed on the intermediate member, and the light base is supported on the support frame at an intermediate height, having a circuit board with plural LED fixed and sealed in the interior hollow of the light base to make them waterproof. The light cover closes the rear side of the support frame and the light base. The support frame and the bottom base are positioned in an acute angle to let the LED in the light base incline downward so that the light of LED may shine slantingly downward through a lens to shoot on a license plate positioned under the license plate light.

4 Claims, 3 Drawing Sheets

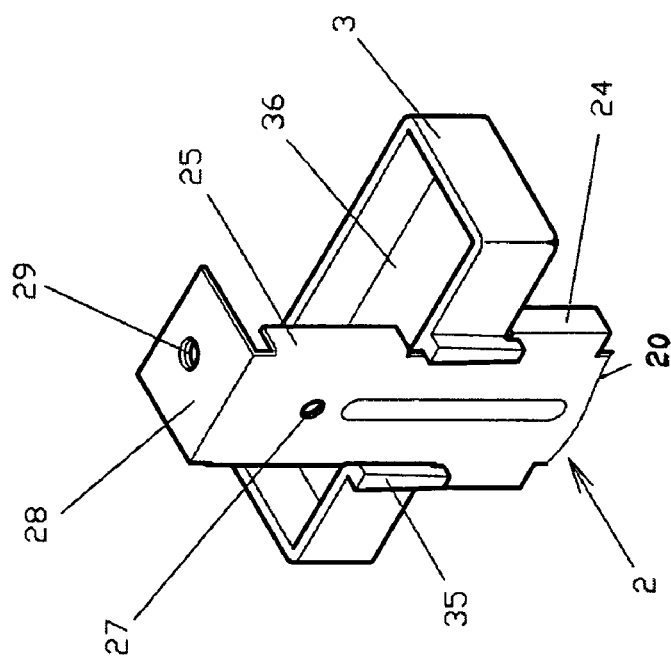
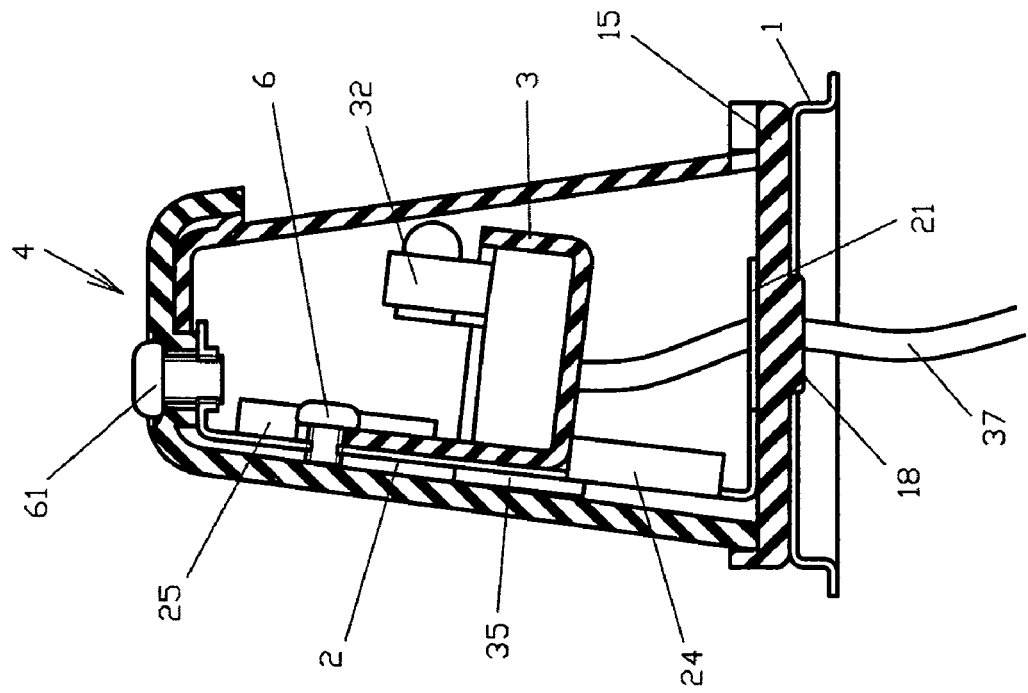
FIG.3
FIG.2

LICENSE PLATE LIGHT

BACKGROUND OF THE INVENTION

1. Field of the Invention

This invention relates to a license plate light, particularly to one provided with a sealed circuit board with plural LED fixed in a light base as a unit and separated from the exterior air, having a waterproof function and a long service life, easy to assemble and disassemble, and stable after assembled. The LED are positioned in a radial shape to upgrade their light, and the light base is supported by a support frame slantingly positioned to a bottom base, so the light of the LED can shine a little slantingly in the preset scope to pinpoint the license plate.

2. Description of the Prior Art

The license plate is very important for the traffic authorities for checking data about automobiles in case of need, and it is easy to check during daytime, but rather difficult to be seen or checked during nighttime. Mostly incandescent lights are used as the conventional license plate lights, having weak beams, and the light base and the incandescent light are not sealed waterproof. So its conductive wires of the light base may easily become short-circuited by rain and high heat. Once the incandescent light is damaged, the whole license plate light with the light base has to be discarded, impossible to be repaired with much less expense.

SUMMARY OF THE INVENTION

This invention has been devised to offer a license plate light having good waterproof, strong light brilliance, and a long service life.

The license plate light in the invention has a feature that a circuit board with plural LED is fixed radially in an opaque light base supported at an intermediate height of a support frame fixed on an intermediate member positioned on an opaque bottom base, and a light cover closes up the support frame and the light base with a lens fixed at the front side. The support base together with the light base is positioned in an acute angle with the bottom base, so the LED is also a little inclined downward to the bottom base, so the light of the LED may shine a little downward through the lens positioned at the front side to accurately shoot on the license plate positioned under the license plate light. Further, the circuit board and the LED are sealed in the interior hollow of the light base with sealing material, preventing water from damaging them.

BRIEF DESCRIPTION OF DRAWINGS

This invention will be better understood by referring to the accompanying drawings, wherein;

FIG. 2 is a left cross-sectional view of the license plate light in the present invention;

FIG. 3 is a perspective view of a light base combined with a supporter frame in the present invention;

DETAILED DESCRIPTION OF THE PREFERRED EMBODIMENT

Figure 1:
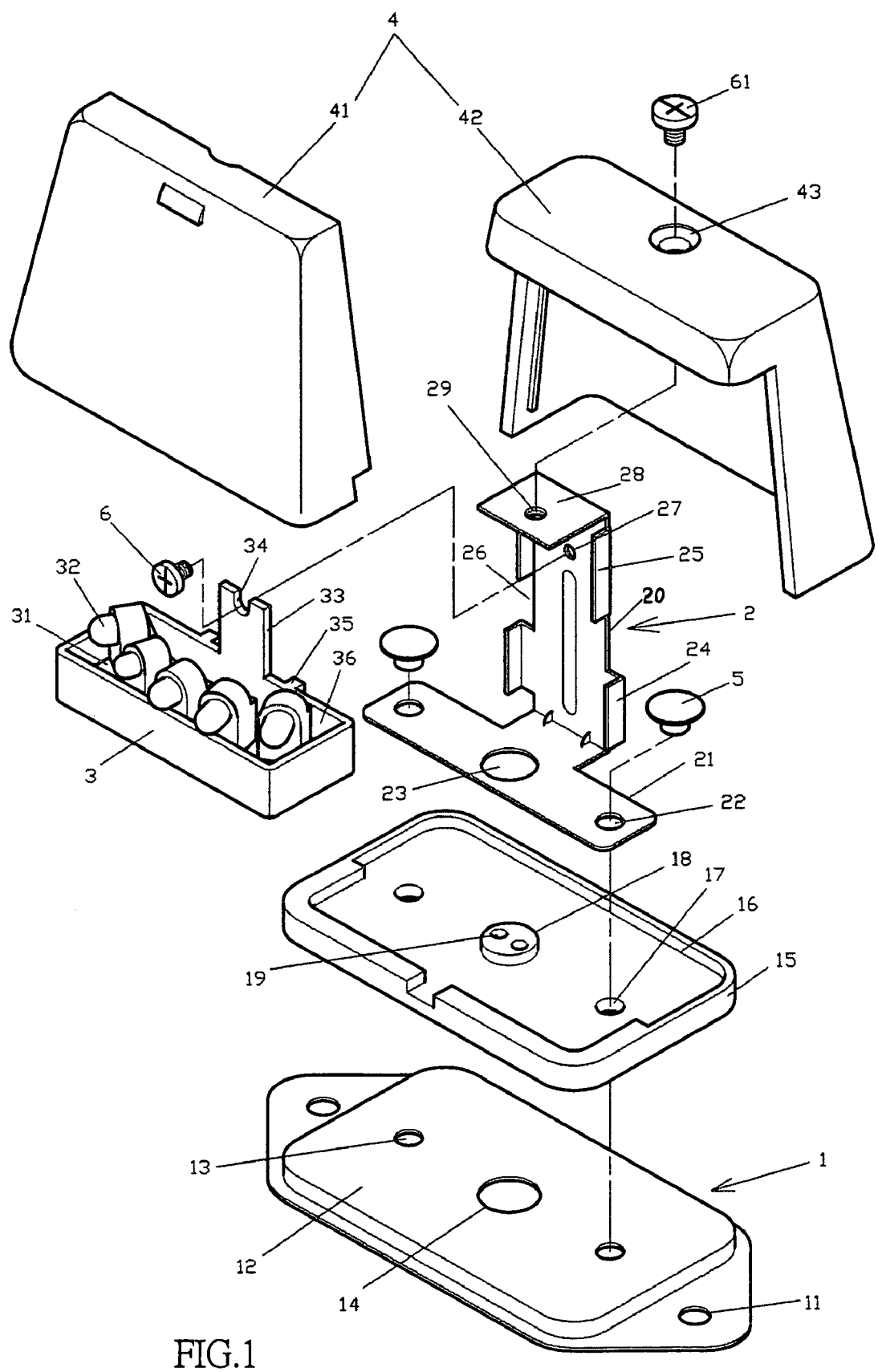
FIG. 1 is an exploded perspective view of a license plate light in the present invention.

A preferred embodiment of a license plate light in the present invention, as shown in FIGS. 1 and 2, includes a bottom base 1, an intermediate member 15, a support frame 2, a light base 3 and a light cover 4 as main components combined together.

The bottom base 1 is opaque as a traditional one, provided with a threaded hole 11 at two sides for bolts to fix the bottom base 1 on an automobile body or a license plate hanger 8. The bottom base 1 further has a swelled-up member 12 on a substantive portion of its upper surface, two holes 13 spaced apart at two sides of the swelled-up member 12, and a center hole 14 between the two holes 13.

The intermediate member 15 of a plate shape is positioned on the swell-up portion 13 of the bottom base 1, having a recess 16 in a substantive portion of its upper surface, two holes 17 spaced apart at two sides in the recess 16 to correspond to the two holes 13 of the bottom base 1, and a disc projection 18 in the center with two through holes 19.

The vertical support frame 2 has a bottom horizontal plate 21, as shown in FIG. 2, and a vertical plate 20 extending up upright from a side of he bottom plate 21 and forming an acute angle with the bottom plate 21. The bottom plate 21 has two holes 22 spaced apart in two sides to correspond to the two holes 17 of the intermediate member 15, a center hole 23 to correspond to the center projection 18. The vertical plate 20 has a lower bent wall 24 respectively extending right-angled inward from two lower sides and two upper bent walls 25 respectively extending right-angled inward from two upper sides, a recess 26 respectively formed between the two lower bent walls 24 and the upper bent walls 25. The vertical plate 20 further has a hole 27 between two upper bent walls 25. An upper horizontal plate 28 extends right-angled inward from the upper end of the vertical plate 20, having a center hole 29.

The light base 3 is opaque and shaped a rectangular case with an open side, having an interior hollow 36 for a circuit board 31 to be fixed therein, and a vertical plate portion 33 extending from a rear side wall and having a notch 34 in an upper side to face to the threaded hole 27 of the vertical plate 20. Further, a sidewise post 35 is respectively provided at two sides of the rear wall of the light base 3 and extending downward to beyond the bottom of the light base 3 and fitting in the two recesses 26 of the support frame 2 and contacting tightly with the two lower bent walls 24 of the support frame 2. The circuit board 31 has a plurality of LED 32.

The light cover 4 consists of a traditional lens 41 and an opaque cover 42, closing on the support frame 2 and the light base 3, and the cover 42 has a hole 43 facing the hole 29 of the support frame 2.

In assembling, referring to FIG. 2, firstly, the intermediate member 15 is placed on the bottom base 1, with the round projection 18 fitting with the center hole 14, with the two holes 17 facing the two holes 13. Then the support frame 2 is combined with and on the intermediate member 2 together with the bottom base 1, with the center hole 23 of the bottom plate 21 fitting with the upper portion of the round projection 18, and with the two holes 22 facing the two holes 17 and the two holes 13 so that rivets 5 may fit in those three sets of holes 22, 17 and 13, assembling stably together the support frame 2 with the bottom base 1 and the intermediate member 15. As the vertical plate 20 and the lower plate 21 are positioned mutually in an acute angle, it is also positioned in an acute angle with the bottom base 1. Next, referring to FIG. 3, after the two projecting posts 35 of the light base 3 are fitted in the two recesses 26 of the support frame 2, the light base 3 is located a little inclined downward, and the lower ends of the two projecting posts 35 tightly contact the two lower bent walls 24 of the vertical wall 20, with the notch 34 of the upright wall 33 of the light base 3 facing the threaded hole 27 and a screw 6 screws with the threaded hole 27 to secure stably the light base 3 with the support frame 2. Then two conductive wires 37 are connected with the circuit board 31, extending through the light base 3 and the two holes 19 of the round projection 18 of the intermediate member 15 and out of the bottom base 1. Then the light cover 4 is closed up the light base 3 and the support frame 2 on the bottom base 1, with the opening of the light cover 4 fitting in the recess 16 of the intermediate member 15, and with the through hole 43 of the light cover 4 facing the hole 29 of the support frame 2 for a screw 61 to screw tightly together the light cover 4 with the support frame 2, finishing assembly of the license plate light.

Figure 6:
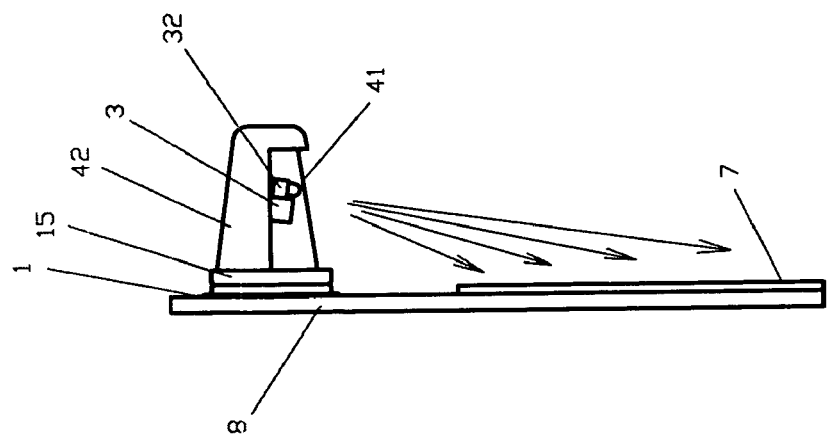
FIG. 6 is another side view of the license plate light in the present invention.
Figure 5:
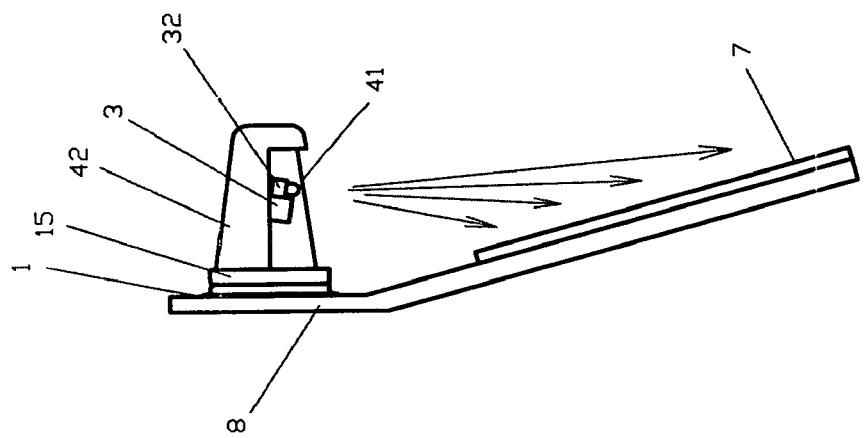
FIG. 5 is a side view of the license plate light in the present invention.
Figure 4:
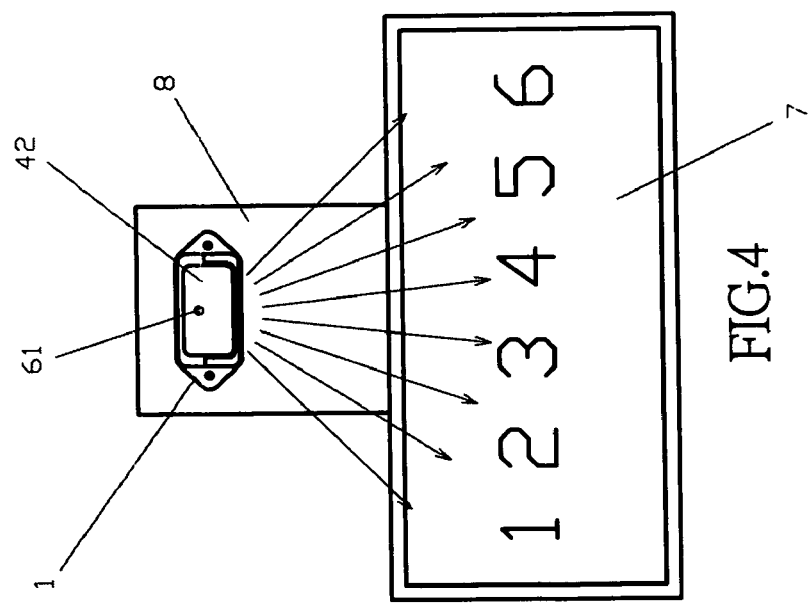
FIG. 4 is a front view of the license plate light lit up to shoot light on a license plate in the present invention.

Next, As shown in FIG. 4, the LED are fixed radially in a curved line on the circuit board 31, giving out light strongly to shine on the license plate 7. In addition, the light of the LED can accurately shoot on the license plate, because the support frame 2 and the bottom base 1 are positioned in an acute angle, and the light base 3 is combined with the support frame 2 in a preset scope, as shown in FIGS. 5 and 6.

It is worth to mention that the light base 3 is possible to be replaced easily by loosening the screw 6, even though the light base 3 is combined with the support frame 3 by means of the two projecting posts 35 fitting in the two recesses 26, with the two lower walls 24 firmly contacted by the lower ends of the two posts 35, and with the screw 6 engaging with the threaded hole 27. Further, the circuit board 31 and the plural LED are deposited in the interior hollow 36 of the light base 3 and sealed with sealing material, separated from the outer air so as to have waterproof function for prolonging their service life.

While the preferred embodiment of the inventin has been described above, it will be recognized and understood that various modifications may be made therein and the appended claims are intended to cover all such modifications that may fall within the spirit and scope of the invention.

What is claimed is:

1. A license plate light comprising:
    a bottom base being opaque and of a plate shape and having a threaded hole respectively at two sides for a bolt to engage;
    an intermediate member of a plate shape placed on said bottom plate;
    a support frame having a bottom horizontal plate, a vertical plate and an upper horizontal plate, said vertical plate extending up from a rear side of said bottom plate and connected with said upper plate, said vertical plate having two lower bent walls right-angled inward respectively at two lower sides and two upper bent walls right-angled inward at two upper sides, said two lower bent walls and said upper bend walls respectively separated by a recess, said vertical plate having a threaded hole in an upper portion between said two upper bent walls, said intermediate member fixed on said lower horizontal plate with rivets;
    a light base being opaque and shaped as a rectangular case with an open side;
    a circuit board fixed in an interior hollow of said light base, a plurality of LED fixed radially on said circuit board;
    a light cover consisting of a traditional lens and a cover body, said lens positioned in front of said support frame and combined with said upper horizontal plate of said support frame, said cover body positioned at a rear side of said support frame and secured stably with the support frame with a screw screwing an upper wall of said cover body with said upper plate of said support frame; and,
    said light base further having an upright wall extending up from a rear side, said upright wall having a notch in an upper edge, said notch facing said threaded hole of said support frame for a screw to screw with for securing said light base stably with support frame, said rear side of said light base having a projecting post respectively extending down from two sides and having its lower end reaching beyond the bottom of said light base, said two projecting posts fitting in said two recesses of said vertical plate of said support frame, lower ends of said two projecting posts firmly contacting and securing said two lower bent walls of said support frame so as to keep said light base secured with said support frame.

2. The license plate light as claimed in claim 1, wherein said support frame and said lower horizontal plate are positioned in an acute angle.

3. The license plate light as claimed in claim 1, wherein said plural LED on said circuit board is fixed radially in a curved line.

4. The license plate light as claimed in claim 1, wherein said circuit board with said LED is fixed in an interior hollow of said light base, and sealed completely with sealing material.

* * * * *